May 10, 1966 — M. B. COLLITO — 3,250,003
ORTHODONTIC METHOD
Filed Dec. 8, 1960 — 5 Sheets-Sheet 1

INVENTOR.
MICHAEL B. COLLITO
BY *Shapiro and Shapiro*
ATTORNEYS

May 10, 1966   M. B. COLLITO   3,250,003
ORTHODONTIC METHOD
Filed Dec. 8, 1960   5 Sheets-Sheet 2

INVENTOR.
MICHAEL B. COLLITO
BY
*Shapiro and Shapiro*
ATTORNEYS

May 10, 1966  M. B. COLLITO  3,250,003
ORTHODONTIC METHOD
Filed Dec. 8, 1960  5 Sheets-Sheet 3

INVENTOR.
MICHAEL B. COLLITO
BY
*Shapiro and Shapiro*
ATTORNEYS

May 10, 1966 M. B. COLLITO 3,250,003
ORTHODONTIC METHOD
Filed Dec. 8, 1960 5 Sheets-Sheet 4

INVENTOR.
MICHAEL B. COLLITO
BY
*Shapiro and Shapiro*
ATTORNEYS

May 10, 1966 M. B. COLLITO 3,250,003
ORTHODONTIC METHOD
Filed Dec. 8, 1960 5 Sheets-Sheet 5

INVENTOR.
MICHAEL B. COLLITO
BY
*Shapiro and Shapiro*
ATTORNEYS

United States Patent Office 3,250,003
Patented May 10, 1966

3,250,003
ORTHODONTIC METHOD
Michael B. Collito, 353 Roseville Ave., Newark, N.J.
Filed Dec. 8, 1960, Ser. No. 75,052
7 Claims. (Cl. 32—14)

This application is a continuation-in-part of Serial No. 34,934, filed June 9, 1960, for "Orthodontic Methods and Appliances," now abandoned.

This invention relates generally to orthodontic methods and devices, and more particularly is concerned with orthodontic practices including the attachment of appliances to teeth, the treating of teeth, and the correction and repair of dental or medical anomalies.

In the practice of orthodontia, one of the common procedures involves the attachment of brackets and the like to the teeth of a patient, so that arch wires may be secured to the brackets and thereby exert corrective forces upon the teeth to realign or reposition them. A widely used scheme for attaching the brackets to the teeth employs metal bands which are fitted around each tooth and to which the brackets, also of metal, are secured as by soldering, welding, or brazing. The fabrication of such bands is time consuming, tedious, difficult, and expensive. The placement of such bands involves considerable discomfort to the patients, particularly to children, because of the extended periods of time necessary for fitting and adjusting each metal band to its tooth. In addition, the use of such bands sometimes leads to deleterious side effects, such as the promotion of decay of the teeth surfaces adjacent and under the bands. From the aesthetic point of view the derogatory effect of metal bands is self-evident and needs no elucidation for anyone who has ever observed a patient wearing such bands.

It is accordingly a primary object of the present invention to provide improved methods and devices of orthodontia which overcomes or significantly alleviate the disadvantages of prior comparable methods and devices, such as the use of the metal bands just described.

Another object of the invention is to provide unique orthodontic appliances.

Yet another object of the invention is to provide a method of attaching orthodontic appliances to teeth which eliminates the need for the individual tooth bands previously required.

A still further object of the invention is to provide improved orthodontic appliances which are easy to manufacture, easy to install, and which may be readily removed when desired.

An additional object of the invention is to provide improved orthodontic methods and devices relating to the attachment of appliances and the like to teeth by the use of suitable adhesives.

A further object of the invention is to provide improved orthodontic methods and devices which ensure the firm and reliable adhesive attachment of appliances to teeth in the environment of the oral cavity.

Yet another object of the invention is to provide unique and improved orthodontic bands.

An additional object of the invention is to provide unique methods for isolating and applying pressure to orthodontic attachments during the setting of adhesives employed to secure the attachments to teeth.

Another object of the invention is to provide unique methods for forming a base layer on a tooth surface to which an attachment is to be applied.

A further object of the invention is to provide unique methods for forming an attachment or the like in situ on a tooth surface.

Still another object of the invention is to provide unique methods for applying protective films to teeth.

Another object of the invention is to provide unique methods for applying medicaments to teeth.

A further object of the invention is to provide unique methods for repairing tooth fractures.

Another object of the invention is to provide unique tooth patches.

A further object of the invention is to provide unique methods of stabilizing the position of teeth or splinting teeth without the use of brackets or the like.

Still another object of the invention is to provide unique prosthetic devices.

An additional object of the invention is to provide a unique method of installing individual artificial teeth or groups of teeth.

The foregoing and other objects, advantages, and features of the invention, and the manner in which the same are achieved will become more fully apparent upon consideration of the following detailed description of the invention taken in conjunction with the accompanying drawings, which illustrate preferred and exemplary embodiments, and wherein:

FIGURES 39a–39e are perspective views illustrating steps in accordance with a further concept of the invention;

Figures 1, 2, 8, 9:
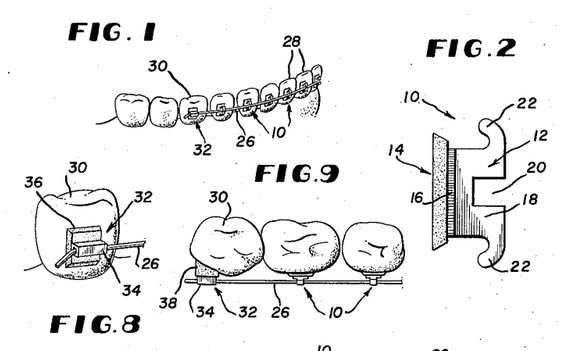
FIGURE 1 is a perspective view illustrating a typical installation of the invention.
FIGURE 2 is a side elevation view illustrating an appliance of the invention.
FIGURE 8 is a perspective view of a detail of the invention.
FIGURE 9 is a top view of another detail of the invention.
Figure 3:
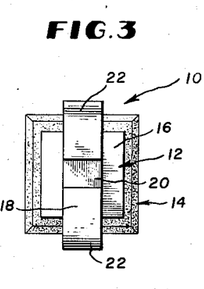
FIGURE 3 is a front elevation view illustrating the appliance of FIGURE 2.

Referring to the drawings, and initially to FIGURES 2 and 3 thereof, one aspect of the invention is concerned with the provision of an improved orthodontic appliance 10, comprising a bracket 12 and a backing 14. The bracket per se is of the known angle or edgewise type, but it will become apparent that the teachings of the invention may be applied to other types of brackets, such as the ribbon arch, universal, twin arch, pin and tube, labiolingual, Begg, or the Kesling, the bracket shown merely being illustrative. In the form shown the bracket has a base plate 16 formed integrally with a U-shaped channel portion 18 defining a notch 20 between its arms and including hooklike extensions 22. While such brackets as presently employed are formed of a suitable metal, such as stainless steel and gold, in order that they may be welded or soldered to the tooth bands employed heretofore, the present invention permits the use of appliances formed of different materials, such as hard rubber or plastic, and the materials may be transparent, translucent, colored, or pigmented to harmonize with tooth enamel.

In accordance with a preferred mode of realization of the invention, the bracket 12 is secured to the backing 14, which is formed of a more flexible, resilient material, such as a natural or synthetic rubber or a suitable plastic, such as a thermosetting or thermoplastic resin of like or similar properties. In a typical case, the backing layer 14 is slightly larger in area than the base plate 16 of the bracket and may be bevelled as shown to prevent the accumulation of food particles at the edge of the appliance. Although a rectangular backing layer and bracket are shown, either may be circular or have any other suitable configuration. In practice the backing layer 14 may have a thickness of about 1/16 of an inch or even less. Typically, the material of the backing may be similar to that of a common rubber band. The backing may be secured to the bracket per se in any suitable manner, as by cementing one surface of the backing to the opposed surface of the base plate 16 through the use of a suitable adhesive, one form of which will be descrbed more fully hereinafter. Alternatively, the bracket could be molded into the resilient backing, or if the bracket itself is formed of a rubber or plastic material, the backing might be made integral with the bracket but dimensioned or otherwise treated to make the backing more flexible than the bracket per se.

In accordance with one concept of the invention, dental appliances such as the appliance 10 just described are secured to the teeth of a patient adhesively. The applicant has found that an adhesive sold by the Eastman Chemical Co., of Kingsport, Tennessee, under the name "Eastman 910 Adhesive," is well-suited to this purpose. This adhesive is a monomeric alkyl ester of alpha-cyanoacrylic acid having the general formula:

Where R is an alkyl group of 1 to 16 carbon atoms, a cyclohexyl group, or a phenyl group. More specifically, the Eastman 910 Adhesive is 90–92% methyl alpha-cyanoacrylate, with 3–4% ester type plasticizer, 5–6% polymeric type thickening agent, and a trace of an inhibitor or stabilizer. Thin films of the adhesive are rapidly autopolymerizable, being stabilized against polymerization in bulk by a stabilizing agent such as sulphur dioxide, present in a concentration of about 0.001% to 0.06% by weight. Highly tenacious bonds are rapidly produced with very thin applications of the adhesive. Adhesives of the foregoing type are described in the following United States patents: 2,721,858, 2,748,050, 2,756,251, 2,763,585, 2,763,677, 2,765,332, 2,768,109, 2,776,232, 2,784,127, 2,784,215, 2,794,788, 2,816,093.

Figure 4:
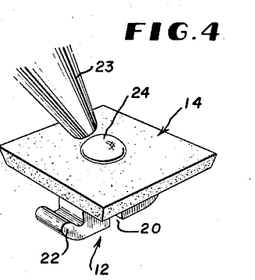
FIGURE 4 is a perspective view illustrating one step in a method of the invention.
Figure 5:
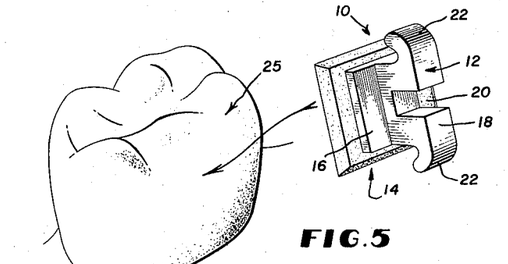
FIGURE 5 is a perspective view illustrating another step in a method of the invention.
Figures 6, 7, 10, 11:
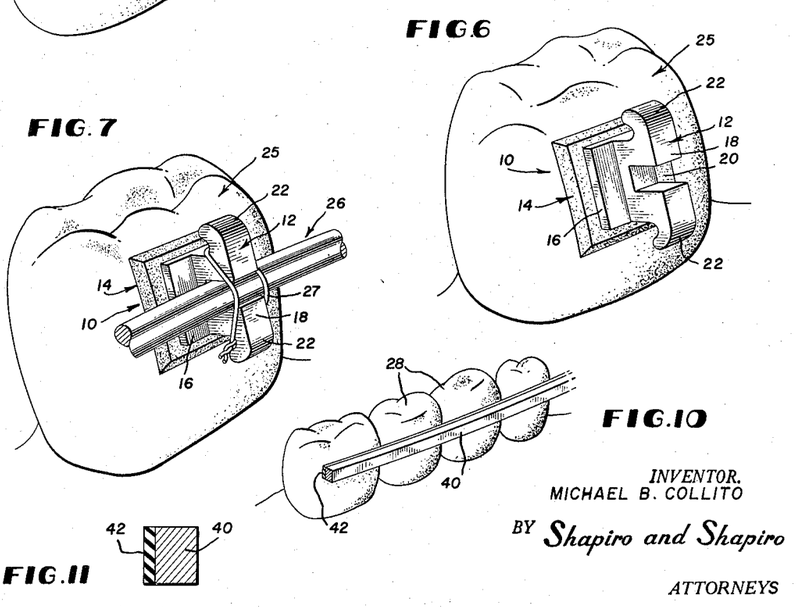
FIGURE 6 is a perspective view illustrating still another step in a method of the invention.
FIGURE 7 is a perspective view illustrating a later step in a method of the invention.
FIGURE 10 is a perspective view of a modification of the invention.
FIGURE 11 is a sectional view of the modification of FIGURE 10.

In accordance with the invention, a drop of adhesive 24 is applied to the exposed surface of the backing 14 from the end of a dispenser nozzle 23, as shown in FIGURE 4, and then the backing is placed against a previously cleaned and dried surface of a tooth 25, as indicated in FIGURE 5, is moved laterally slightly to spread the drop of adhesive into a thin film, and is pressed gently against the tooth surface. While the film of adhesive could be applied to the tooth, rather than to the backing, it is preferred to apply the adhesive to the backing to prevent the application of excess adhesive to the teeth. After the appliance is positioned against the tooth, it is held for a period of ten to twenty seconds. The assembled appliance and tooth then appear as shown in FIGURE 6. Since a very tenacious bond of appliance to tooth is obtained very rapidly, the appliance of the invention is ready for orthodontic use soon after it is placed on the tooth. In accordance with conventional practices, an arch wire 26 is passed through the notch 20 of the appliance, being secured to the bracket as by ligating wire 27 looped about the hooklike extensions 22 as shown in FIGURE 7. While a wire of round cross-section has been shown, wires of other cross-section may be used, as for example the rectangular wire employed for more positive tooth control. FIGURE 1 illustrates a typical application of the invention to the realigning or repositioning of teeth 28, to which the appliances of the invention are attached. As shown in FIGURE 8, the arch wire 26 is anchored to a molar 30 by a molar sheath 32, which comprises a sleeve 34, shown rectangular in cross-section for illustrative purposes, having a resilient backing strip 36 like the backing 14 previously described. The molar sheath may be attached to the molar in the same manner as the appliances 10. The end of the arch wire 26 is passed through the sheath and is secured to the sheath as by bending the end back as shown or in any other conventional manner, such as tying with ligature wire.

The resilient backing 14 facilitates a firm bond between the appliance and the tooth, because it accommodates itself to variations in tooth contour. If desired, the base plate of the bracket and the backing may also be curved or contoured during manufacture to accommodate with the contours of the tooth, the contours of the bracket, or both. For example, when the bracket is rounded or tube shaped, the backing may be shaped and dimensioned to embrace the curved portion of the bracket and at the same time to present a suitable surface for adhesion to the tooth. FIGURE 9 illustrates the manner in which a tapered backing 38 may be employed to accommodate the variation in tooth contour of a third molar. In this example it is desired to engage the molar sheath 32 without the compensating bends in the arch wire which would be required to prevent the application of undue rotational forces to the molar. Alternatively, the taper could be provided by a separate shim cemented between the usual backing and the tooth.

The backing 14 also serves to maintain the permanency of the bond by accommodating differences in thermal expansion and contraction between the bracket and the tooth. An attendant advantage of the backing is the thermal insulation of the tooth from the bracket and arch wire. Still another advantage is the action of the backing in absorbing the initial shock applied by the arch wire to the tooth and the more gradual, resilient application of the arch wire force to the tooth. Moreover, the backing facilitates the removal of the dental appliance when removal is desired. Removal is accomplished by cutting through the backing material and by scaling and polishing off the backing material which remains adhered to the tooth along with the residual adhesive.

Another concept of the invention is illustrated in FIGURES 10 and 11. Here is shown the application of an arch wire to teeth without the use of brackets or the like, the purpose being the rapid and facile mass stabilization of a group of teeth. As shown, an arch wire 40 is provided with a resilient backing 42, which is cemented directly to the teeth without use of brackets, the attachment process being the same as previously described. Although a rectangular wire has been shown, with a backing at one side thereof, a round wire with a suitable shaped backing could be employed. Furthermore, the backing material could surround the entire wire, as by molding the backing on the wire, or the backing material could be placed on the wire in situ in the form of separate sleeves or segments. In addition, by virtue of the broader concept of the invention, attachments of various types, such as vertical hooks, stops, or sleeves may be cemented directly to the arch wire, even while the arch wire is in position in the patient's mouth.

Figures 12, 14:
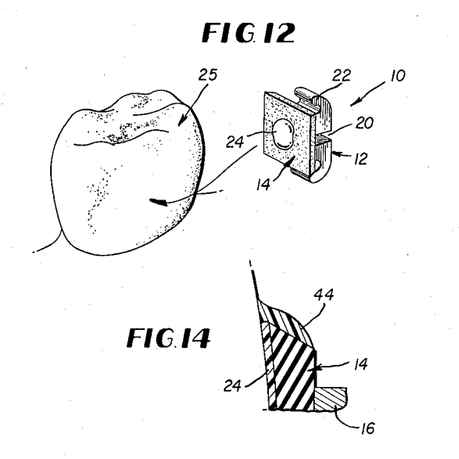
FIGURE 12 is a perspective view illustrating another concept of the invention.
FIGURE 14 is a fragmentary sectional view illustrative of the last-mentioned concept.
Figure 13:
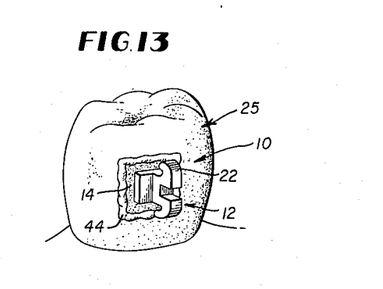
FIGURE 13 is a perspective view further illustrating the concept of FIGURE 12.

By employing the aforementioned Eastman 910 Adhesive a strong bond between orthodontic appliances and tooth enamel may be established very quickly. Adhesive bonds within the oral cavity are subject to attack by moisture and chemical action, and it has been found that the tenaciousness of the bond over protracted periods may be vastly improved by use of sealing agents or sealers to isolate the adhesive from the oral environment. FIGURES 12, 13 and 14 illustrate this concept of the invention. In FIGURE 12 a drop of Eastman 910 Adhesive 24 has been placed on the resilient backing 14 as in FIGURE 4. The attachment is then applied to the tooth as in FIGURE 13 in the manner described with respect to FIGURE 6, and a sealing agent 44 is smoothed around the edges of the backing so as to isolate completely the adhesive film 24 from the conditions within the oral cavity (see FIG. 14). Sealing agents which have been found to be suitable for use in accordance with the invention include the epoxy resins.

Epoxy resins are condensation products of epichlorhydrin and bisphenol A. A formula for such resins is as follows:

The commercial resins (for example, Epon) are mixtures of polymers, where $n$ varies between zero and ten, indicating molecular weights of four hundred to eight thousand, approximately. The reactive epoxide and hydroxyl groups present in these products permit further condensation often effected in the presence of curing agents, such as amines, dibasic acids, polyamides, etc., to form the desired final product. Any of the well known commercially available epoxy resins may be used, as for example, the epoxy resin sold by the Devcon Corporation, Danvers, Massachusetts, under the trade name "Devcon 2-Ton Epoxy Super Glue," or the forty-five-second fast setting epoxy adhesives sold by H. V. Hardman Company, of Belleville, New Jersey.

Sealers in the form of rings, washers, gaskets, or bushings may also be employed. In accordance with this concept of the invention, the appliance is attached to the tooth enamel as before, and then the sealer is applied around the margin of the joint between the appliance and the tooth. For example, a flexible ring as of rubber or the like, may be shaped to fit the junction between the flexible backing of the appliance and the tooth enamel. Such a sealer may be provided with a preformed layer of rubber base adhesive, for example (the margin of the backing layer and the tooth enamel joint may also be precoated with a layer of adhesive), and then the sealer may be installed over the appliance and pressed tightly onto the margin of the junction between the appliance backing and the tooth enamel so as to form a tight seal around the appliance, and thereby to isolate the adhesive film under the backing layer from the environment of the oral cavity. Rubber base adhesives are well known and widely used, and any of the commercially available rubber base adhesives may be employed (with the possible exception of those which have been modified by the addition of toxic agents). For example, the adhesive sold by the Minnesota Mining and Manufacturing Company under the trade name "Minnesota Mining EC 1099" may be used.

Figure 15:
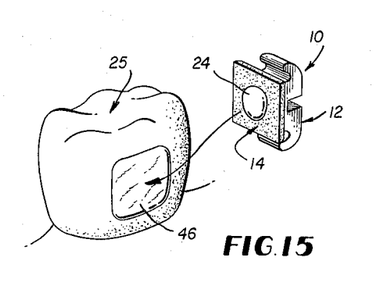
FIGURE 15 is a perspective view of another concept of the invention.
Figure 16:
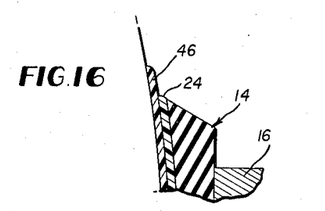
FIGURE 16 is a fragmentary sectional view illustrative of the last-mentioned concept.

Adherence of attachments to tooth enamel may also be vastly improved in accordance with another concept of the invention illustrated in FIGURES 15 and 16. In accordance with this concept of the invention a base layer 46 is formed on the tooth enamel and then the attachment is cemented to the base layer. In the example of FIGURE 15 a drop of Eastman 910 Adhesive 24 is applied to the backing 14 and the attachment is pressed against the base layer and manipulated as previously described to form a film of adhesive. See FIG. 16. The base layer may be formed from an epoxy resin of the type described above, for example, to which an adhesive such as Eastman 910 adheres more reliably than to tooth enamel. The epoxy resin is properly prepared in accordance with conventional techniques and may then be applied to the tooth surface and permitted to set. Other methods in which the base layer may be formed will be described hereinafter. A notable advantage of employing the base layer is the elimination of the need for a sealer.

Figures 17, 18:
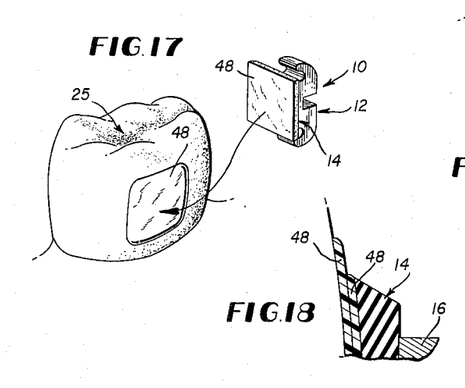
FIGURE 17 is a perspective view of still another concept of the invention.
FIGURE 18 is a fragmentary sectional view illustrative of the last-mentioned concept.

FIGURES 17 and 18 illustrate a modification of the invention in which adhesives other than Eastman 910, such as the epoxy resins previously described, are used exclusively. As shown in these figures the adhesive 48 may be applied to the backing 14 and to the tooth (or it may be applied either to the backing or the tooth). Then the attachment is pressed against the tooth and held in position long enough to ensure a strong bond.

Figure 19:
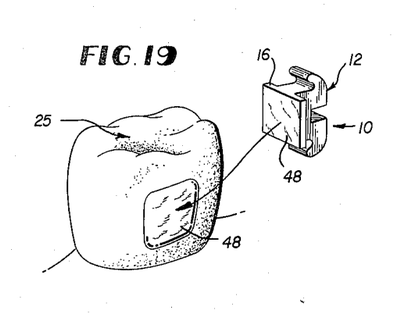
FIGURE 19 is a perspective view of another concept of the invention.
Figure 20:
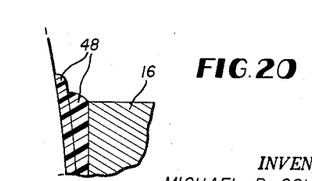
FIGURE 20 is a fragmentary sectional view illustrating the last-mentioned concept.

The use of a thin film of quick setting adhesive like Eastman 910 requires the use of a resilient backing to accommodate the attachment to the tooth. When thicker adhesive layers, such as the epoxy resins, are used, sufficient accommodation may be offered by the adhesive itself to justify the elimination of the backing. Of course, the advantages of resiliency, as set forth above, are lost when using rigid appliances. FIGURES 19 and 20 illustrated this concept of the invention, the adhesive 48 being applied between the tooth and the base 16 of the attachment. The layer of adhesive should be made thick enough to accommodate the base 16 to the contours of the tooth.

Figure 21:
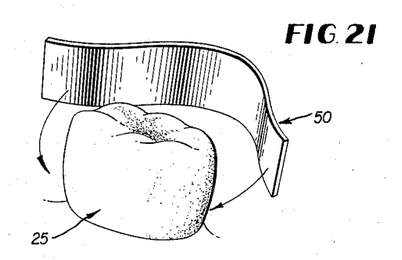
FIGURE 21 is a perspective view illustrating another concept of the invention.
Figure 22:
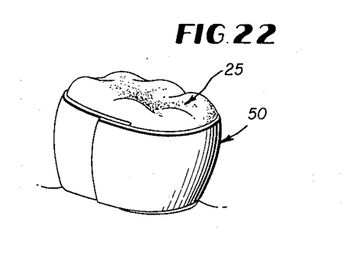
FIGURE 22 is a perspective view further illustrating the last-mentioned concept.
Figure 30:
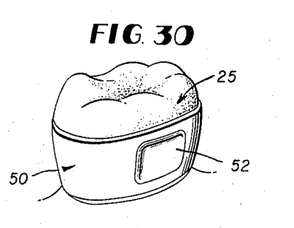
FIGURE 30 is a perspective view of a modification of the invention.
Figures 31, 32:
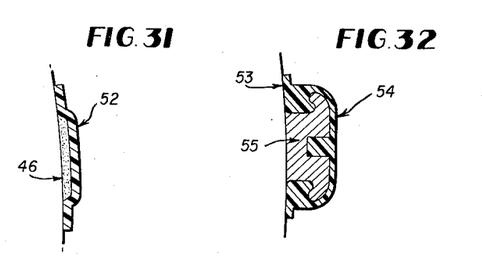
FIGURE 31 is a sectional view of the modification of FIGURE 30.
FIGURE 32 is a sectional view illustrating still another concept of the invention.
Figure 33:
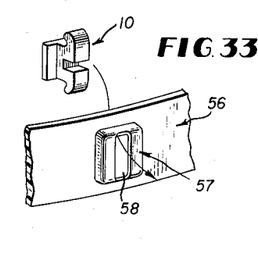
FIGURE 33 is a perspective view illustrating another concept of the invention.
Figures 36, 37, 38, 39:
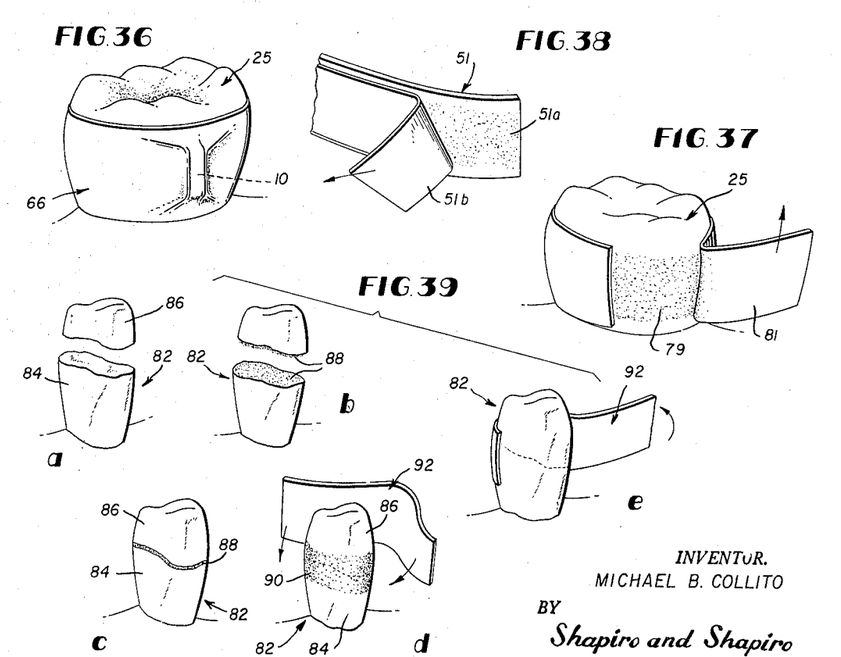
FIGURE 36 is a perspective view illustrating a modified concept of the invention.
FIGURE 37 is a perspective view illustrating still another concept of the invention.
FIGURE 38 is a perspective view illustrating an additional concept of the invention.

FIGURES 30 and 31 illustrate a concept of the invention with respect to the formation of the base layer 46 of FIGURE 15 previously described. In accordance with this concept, a band 50 having a preformed cavity or pocket 52 is placed around the tooth 25. The band is formed of a thin strip of flexible resilient material, such as vinyl plastic. The band is preferably transparent for aesthetic reasons, but since the band will only remain on the tooth long enough for the formation of the base layer, it may be formed of materials which are translucent, colored, or opaque. The band is tightly wrapped about the tooth 25 as shown in FIGURE 21, and the ends may be overlapped as shown in FIG. 22. The band may be secured to the tooth by the used of a suitable adhesive, such as the rubber base adhesives set forth previously. The adhesive may be spread in a layer on either or both of the coacting surfaces of the tooth and band and may be permitted to set somewhat before the surfaces are joined. The adhesive may also be provided as shown in FIG. 38, in which a band 51 has a preformed layer of pressure-sensitive adhesive 51a protected by a removable covering strip 51b. The covering strip is removed to expose the adhesive just prior to application of the band to the tooth. The band may be particularly constructed to facilitate the attachment to the tooth, as indicated in FIGURE 33, wherein a band 50a has a tongue 50b formed at one end of the band and a slot 50c at the other end through which the tongue may be pulled to tighten the band about the tooth. Also clips or staples may be used to join the ends of the band.

In the embodiment of FIGURES 30 and 31, the material which is to serve as the base layer 46 of FIGURE 15 is placed in the pocket 52 before the band is applied to the tooth. The pocket may be precoated with a conventional mold release agent, such as wax, silicone grease, or calcium stearate. The band serves to mold the base layer to the desired configuration and at the same time isolates the base layer material from the oral cavity so that it may set properly. When the base material has hardened, the band is stripped off of the tooth, as by the aid of a cutting or scaling instrument, The bands of the invention may also be employed as in FIGURE 32 to mold orthodontic appliances directly upon the tooth enamel. Such a band 53 has a pocket 54 which is shaped to form the molding cavity. A suitable material 55, such as an epoxy resin, is pressed into the crevices of the mold cavity (after application of a mold release agent) and then the band is applied to the tooth as described above and permitted to remain there until the molding material has set properly. The band may then be stripped from the tooth and from the molded device, being cut where necessary to facilitate its detachment. The orthodontic appliance will remain firmly fixed to the tooth enamel.

In the adhesive attachment of devices to tooth enamel it is imperative that a strong, reliable bond be formed. While various adhesives may be utilized for such orthodontic use, the strength and reliability of the bond depends upon the setting of the adhesive in the proper environment, which may not be provided by the oral cavity. For example, many adhesives bond most strongly when isolated from moisture during setting of the adhesive and when subjected to pressure during the setting. The bands of the invention are particularly useful in ensuring the proper setting of adhesives used in the oral cavity.

Figure 34:
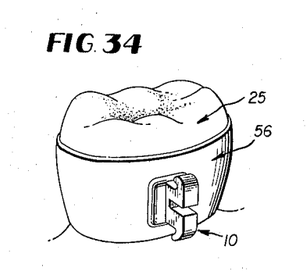
FIGURE 34 is a perspective view further illustrating the concept of FIGURE 33.
Figure 35:
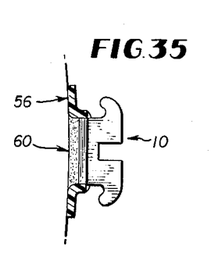
FIGURE 35 is a sectional view also illustrative of this concept.

FIGURES 33, 34, and 35 illustrate one form of band which may be used to ensure the proper setting of an adhesive between an orthodontic appliance and a tooth. A band 56, preferably a plastic strip, has a preformed pocket 57 with an opening 58 adapted to receive the projecting portion of an appliance 10 which may be of the type previously described. The appliance is inserted through the opening 58 as shown, the band being deformed somewhat to permit the insertion of the appliance and to ensure a tight fit at the edges of the opening 58. A suitable adhesive 60 is then placed on the appropriate surface of the appliance, and the band and appliance are then secured to the tooth as shown in FIGURE 34. If desired, the pocket 57 may serve to mold the adhesive to the desired shape in the manner of FIGURES 30 and 31. The band serves to press the appliance against the tooth and to isolate the adhesive from the oral cavity. Later, when the adhesive 60 has set, the band 56 may be stripped from the tooth, leaving the appliance 10 attached to the tooth enamel. However, if the band is formed of a transparent or harmoniously colored material, it may be left on the tooth for as long as desired without appreciably detracting from the appearance of the wearer.

Figure 28:
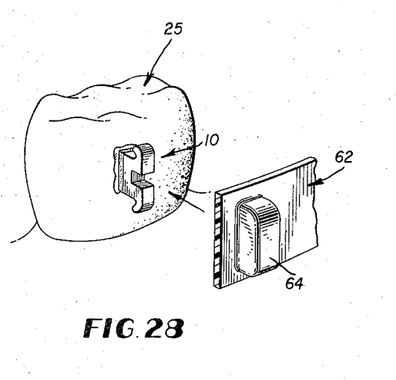
FIGURE 28 is a perspective view illustrating still another concept of the invention.
Figure 29:
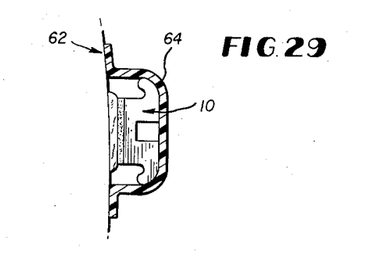
FIGURE 29 is a sectional view of the embodiment of FIGURE 28.

FIGURES 28 and 29 illustrate a modification of the invention wherein a band 62 having a closed pocket 64 is employed. In accordance with this concept of the invention and appliance 10 is first attached to a tooth 35 by a suitable adhesive, and then the band is placed over the appliance and wrapped about the tooth, being secured to the tooth as previously described. The band presses the appliance against the tooth and provides the desired adhesive isolation. In this form of the invention the appliance is completely enclosed during the setting of the adhesive, and the band must be removed before the appliance can be utilized or must be cut to expose the working portion of the appliance.

FIGURE 36 illustrates an embodiment of the invention in which the band 66 does not have a preformed pocket but instead is formed of a thin, readily stretchable material, such as vinyl plastic, which may be pulled tightly over an appliance secured to the tooth as in FIGURE 28 and which will conform to the contours of the appliance to press the appliance against the tooth and to ensure that the appliance is isolated from the oral cavity during the setting of the adhesive. Here again, after the adhesive has set, the band is stripped off, leaving the appliance secured to the tooth.

Figure 24:
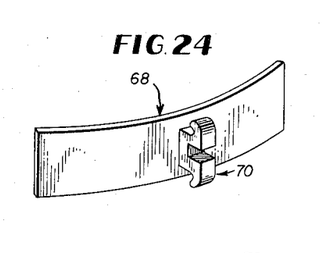
FIGURE 24 is a perspective view of still another modification of the invention.
Figure 25:
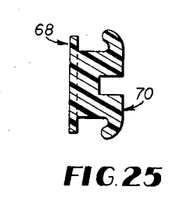
FIGURE 25 is a sectional view of the embodiment of FIGURE 24.
Figure 26:
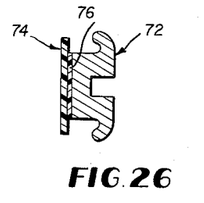
FIGURE 26 is a sectional view of a modified embodiment.

Bands constructed in accordance with the invention may also be utilized as a base for securing orthodontic appliances to teeth throughout the period of appliance use. FIGURES 24 and 25 illustrate an embodiment of the invention in which a band 68 has an integral bracket portion 70, the form shown merely being illustrative. The band and bracket may be molded as a unit of plastic, for example. Alternatively, as shown in FIG. 26 the bracket, 72, may be attached to a band 74 by an adhesive layer 76. To attach the appliance to the tooth, the band is wrapped about the tooth and secured in the manner previously described.

Figure 23:
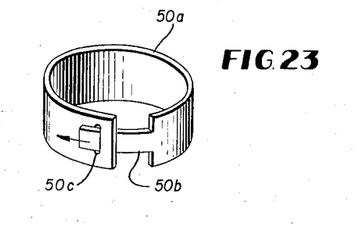
FIGURE 23 is a perspective view of a modification of the invention.
Figure 27:
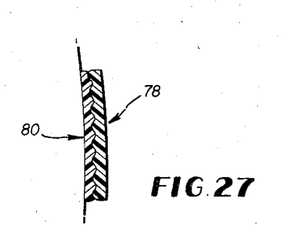
FIGURE 27 is a sectional view illustrating another concept of the invention.

FIGURE 27 illustrates the use of a band of the invention for treating a tooth with medicaments such as fluorides. In this figure the band 79 (shown in cross section) has applied thereto a layer of medicament 81. The medicament may be admixed with a suitable adhesive for securing the band to the tooth, or the attachment of the band to the tooth may be accomplished by the junction at the end of the band, as in FIGURES 22 and 23. As shown in FIGURE 27, the band may be embossed or corrugated to provide depressions for reception of the medicament to ensure an adequate supply of medicament when the band is pulled tightly about the tooth.

Bands of the invention may also be utilized to provide protective coverings for the exposed lateral surfaces of teeth. For example, as shown in FIGURE 37, a suitable material, such as a clear epoxy resin which becomes quite hard upon setting, may be applied as a thin film 78 to the lateral surfaces of a tooth 25. In addition, the film may then be covered by a band 30. When the resin has set to form a hard protective covering, the band may be stripped off as shown. Such procedures may be used in conditions such as hypoplastic enamel or may be used on normal teeth simply as a protective measure or base coating.

Another concept of the invention is concerned with the correction of tooth fractures. FIGURE 39a illustrates a tooth 82 which has broken into two pairs, a part 84 projecting from the gum and a separate part 86. When the tooth is broken, as in an accident, the patient retains the separate portion 86 for repair to be made by the dentist. If a portion of the tooth is not recovered, an artificial replacement portion may be fabricated. In accordance with the invention the opposed fracture surfaces are joined by a layer of suitable adhesive, preferably Eastman 910, which may be applied to both tooth parts as shown at 88 in FIGURE 39b. The tooth parts are then pressed together as shown in FIGURE 39c. A sealing agent, such as a transparent epoxy resin previously described, is then applied as a thin layer 90 about the fracture and any voids at the fracture area may be filled by epoxy resin. After initial setting of the resin a flexible band 92 of the invention may be wrapped about the layer 90 as shown in FIG. 39d and secured as previously described. When the adhesive and sealer have set, the band may be stripped off as indicated in FIGUDE 39c. The parts of the tooth will then remain firmly connected. Tooth fractures are particularly troublesome with children, because the very large pulp chamber of a child's tooth prevents the making of a jacket or crown for the tooth. By virtue of the foregoing concept of the invention this problem is overcome.

While vinyl plastic has been described as a suitable material for forming the bands of the invention, other materials may also be used. In general, it is desired that the band material be flexible and resilient enough to accommodate itself readily to the contours of the teeth, and it should be inert and non-toxic in the envirnoment of the oral cavity. Commercially available se- flexible strips of plastic or the like precoated with a pressure sensitive adhesive are well known and widely used. Some of these materials are particularly known for their use in medical or surgical applications.

Figure 40:
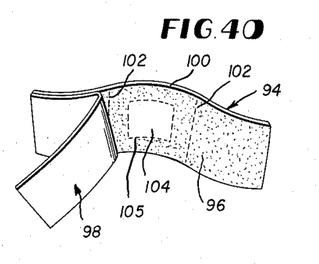
FIGURE 40 is a perspective view illustrating another concept of the invention.

FIGURE 40 illustrates a modified band 94 in accordance with another concept of the invention. This band has a layer of pressure sensitive adhesive 96 covered by a protective strip 98 as in FIGURE 38. However, the band has a section 100 which is adapted to be separated from the remainder of the band. For example, lines of weakness 102 may delineate the section to be separated. In adidtion, a central portion 104 of section 100 (which also may be delineated by lines of weakness 103) may be free of adhesive as indicated.

Figures 41, 42:
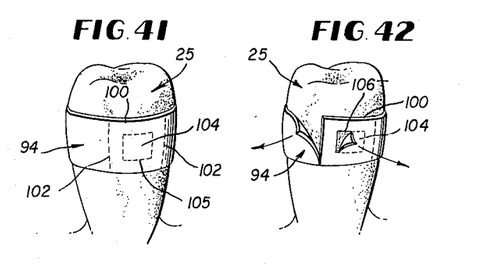
FIGURE 41 is a perspective view illustrating a step in accordance with the last-mentioned concept of the invention.
FIGURE 42 is a perspective view illustrating another step in accordance with the last-mentioned concept of the invention.
Figure 43:
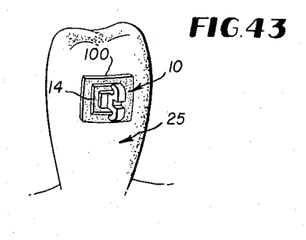
FIGURE 43 is a perspective view illustrating a later step in accordance with the last-mentioned concept of the invention.

In the use of this band, the covering strip 98 is removed as shown in FIGURE 40, and the adhesive of the band is applied to the tooth as the band is wrapped about the tooth shown in FIGURE 41. After the adhesive has set sufficiently, the portions of the band to be removed from the tooth may be cut away and stripped off the tooth as shown in FIGURE 42, leaving the section 100. The application of an entire band, rather than just a discrete section 100 initially, permits the exertion of considerable pressure to the adhesive to ensure that its sets firmly. Within the broader aspects of the invention, however, a separate tooth patch (essentially the section 100 of the band) may be utilized. Then central region 104 of section 100 is also cut away as shown in FIGURE 42 to form a window 106 through which a portion of the enamel is exposed. This portion of the enamel is circumscribed by the ring now constituted by section 100.

Figure 44:
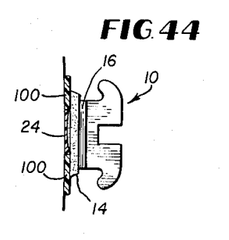
FIGURE 44 is a sectional view further illustrating this concept of the invention.
Figure 45:
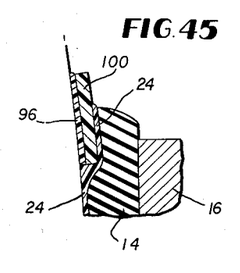
FIGURE 45 is an enlarged fragmentary sectional view also illustrating this concept of the invention.

An orthodontic appliance 10 having a flexible backing layer 14 may then be applied to the patch 100, which constitutes a sealer for the adhesive attachment of the appliance. The adhesive is applied to the backing layer 14 as in FIGURE 12, Eastman 910 preferably being used, and the backing layer is then forced against the exposed enamel portion through the window 106. As shown in FIGURES 44 and 45, the adhesive on the backing layer adheres to the tooth enamel and to the plastic ring 100. The contact of the adhesive with the tooth enamel forms a strong bond between the enamel and the flexible backing, while the adhesive film between the backing and the plastic ring forms a seal which ensures a reliable, long-lasting bond. Within the broader aspects of the invention, it is also possible to employ a tooth patch without the window as a base layer for an orthodontic appliance. The patch may be secured to the tooth by a rubber base adhesive, for example, and then the appliance may be secured to the patch by means of an adhesive such as Eastman 910.

The use of bands of plastic or the like in accordance with the invention permits close conformity of the bands to the contours of the teeth, thereby providing protection against the band being slipped from its desired position on the tooth. This conformity also eliminates the overhang present with the conventional metal bands and eliminates the irritation and decay-provoking condition which persists with such bands. The bands of the invention also permit X-ray examination without removal of the bands, as well as visual clinical examination if the bands are formed of material transparent to light. The desirability of the bands of the invention from the point of view of aesthetics is apparent when bands which are transparent or which conform to the tooth color are employed. Moreover, the bands of the invention are more economical, simpler to install, simpler to manufacture, and eliminate the various operations attendat upon the installation of conventional metal bands. The resilient qualities of the bands of the invention are especially advantageous with respect to the conformity of the bands to tooth contours and with respect to the secure attachment of the bands of the teeth.

The present invention may take advantage of the selective adherence properties of adhesives with respect to different materials. For example, certain adhesives which form strong plastic-to-plastic bonds may be used to join overlapping ends of plastic bands. The adhesives employed between the bands and the teeth may be chosen to provide a bond which is initially strong enough to hold the bands in place but which may be broken when it is desired to remove the bands. In general, the choice of adhesives for securing the bands in place will depend somewhat upon the choice of band material.

Figure 46:
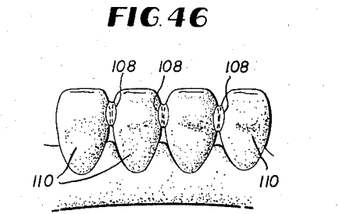
FIGURE 46 is an elevation view illustrating another concept of the invention.
Figure 47:
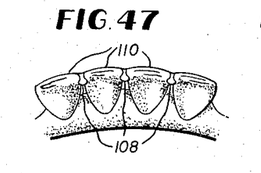
FIGURE 47 is a plan view illustrating the concept of FIGURE 46.

FIGURES 46 and 47 illustrate another concept of the invention directed to the splinting or stabilization of teeth. Teeth which have been brought into position in accordance with other concepts of the invention or in accordance with conventional techniques may be retained in position by an adhesive layer applied between adjacent teeth. Such layers are shown in FIGURES 46 and 47 at 108 between adjacent teeth 110. A small quantity of epoxy resin of the type previously described will serve to bond the teeth firmly together. The teeth should be held in position until the resin has set. As shown, the resin is preferably applied at the contact points and the regions surrounding the contact points. If the teeth have previously been provided with a base layer or coating of epoxy resin or the like, they may be joined by the use of a thin film of an adhesive like Eastman 910, which is quick setting and adheres readily to such a base layer or coating. The film would be applied at the regions 108 as shown in FIGURES 46 and 47.

Figure 48:
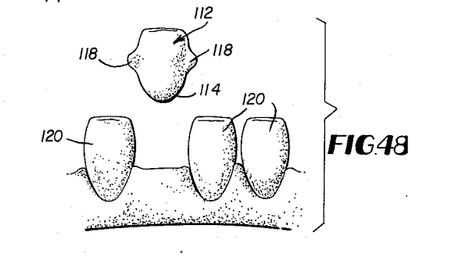
FIGURE 48 is an elevation view illustrating a step in accordance with a further concept of the invention.
Figures 49, 51, 52:
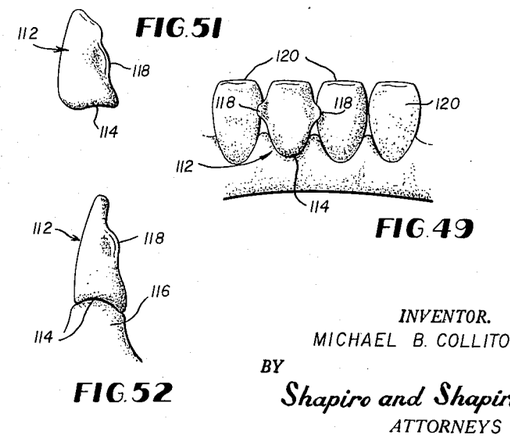
FIGURE 49 is an elevation view illustrating a later step in accordance with this concept.
FIGURE 51 is a perspective view illustrating this concept of the invention.
FIGURE 52 is a side elevation view further illustrating this concept.
Figure 50:
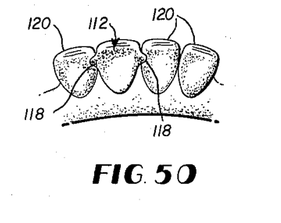
FIGURE 50 is a plan view further illustrating this concept.

FIGURES 48–52 illustrate another concept of the invention. This concept is concerned with the installation of artificial teeth individually or in groups to replace missing natural teeth. As shown in FIGURES 51 and 52 an artificial tooth 112 made in accordance with conventional techniques (and representative of one or more teeth which may be formed as a unit) has a contoured lower surface 114 to match the contour of the supporting dental ridge 116. Projections or ears 118 are preferably provided to aid in securing the artificial tooth to the adjoining natural teeth. As shown in FIGURES 48 and 49 the artificial tooth 112 is inserted in the space between the adjoining natural teeth 120, and the projections 118 as well as the other regions of contact with the natural teeth are secured to the natural teeth by means of a suitable adhesive. The epoxy resins previously described are suitable for this purpose, the artificial tooth being held in position until the resins have set. If the natural teeth have a coating or base layer of epoxy resin previously provided, adhesives like Eastman 910 may be utilized to secure the artificial tooth to the base layer or coating. The artificial tooth may also be provided with an epoxy resin coating or base layer to which the Eastman 910 will adhere strongly.

While preferred embodiments of the invention have been shown and described, it will be apparent to those skilled in the art that changes can be made in these embodiments without departing from the principles and spirit of the invention, the scope of which is defined in the appended claims. Accordingly, the foregoing embodiments are to be considered illustrative, rather than restrictive of the invention, and those modifications which come within the meaning and range of equivalency of the claims are to be included therein.

The invention claimed is:

1. In the art of dentistry, the method of attaching an appliance to a tooth, comprising cementing a sealing ring to the tooth, and cementing an appliance to the tooth through the ring and to the ring at the perimeter of the appliance.

2. In the art of dentistry, the method of attaching an appliance to a tooth, comprising cementing a sealing ring to the tooth by means of a rubber base adhesive, and cementing an appliance to the tooth through the ring and to the ring at the perimeter of the appliance by means of an alpha-cyanoacrylate adhesive.

3. In the art of dentistry, the method of attaching an appliance to a tooth, which comprises the steps of providing a flexible backing upon the appliance to accommodate the appliance to variations in tooth contour, bonding the appliance to a surface of the tooth with a thin film of cyanoacrylate adhesive, and sealing the perimeter of the bond to isolate the bond from the oral cavity.

4. The method of claim 3, wherein the perimeter of the bond is sealed with an epoxy sealing agent.

5. The method of claim 3, wherein the perimeter of the bond is sealed with a flexible sealer rim.

6. In the art of dentistry, the method of attaching an appliance to a tooth by the use of cyanoacrylate adhesive material, which comprises the steps of forming upon the tooth a base layer from a different material to which said cyanoacrylate adhesive material adheres more securely than to the enamel of the tooth, and cementing said appliance to said base layer with a thin film of said cyanoacrylate adhesive material, said base layer being formed by depositing upon the tooth a settable material in plastic state, molding said settable material in situ to conform to a mating surface of said appliance, and permitting said base layer material to set.

7. In the art of dentistry, the method of attaching an appliance to a tooth, which comprises depositing upon the tooth a settable material in plastic state, molding said material in situ to conform to a mating surface of said appliance, permitting said material to set and form a base layer, and cementing said appliance to said base layer with a thin film of adhesive which adheres more securely to said base layer than to the enamel of said tooth.

References Cited by the Examiner

UNITED STATES PATENTS

| | | | |
|---|---|---|---|
| 262,088 | 8/1882 | Morrison | 32—14 |
| 448,745 | 3/1891 | Wright | 32—8 |
| 532,725 | 1/1895 | Dennis | 32—15 |
| 961,287 | 6/1910 | Crane | 32—1 |
| 1,794,213 | 2/1931 | Spahn | 32—14 |
| 1,797,480 | 3/1931 | Preston | 128—89 |
| 1,812,008 | 6/1931 | Lace | 32—17 |
| 2,310,448 | 2/1943 | Lieb | 32—63 |
| 2,436,623 | 2/1948 | Van Zile | 32—1 |
| 2,449,522 | 9/1948 | White | 32—8 |
| 2,481,177 | 9/1949 | Tofflemire | 128—89 |
| 2,527,526 | 10/1950 | Brusse | 32—14 |
| 2,646,622 | 7/1953 | Christie | 32—63 |
| 2,755,552 | 7/1956 | Brandau | 32—2 |
| 2,765,332 | 10/1956 | Coover et al. | 32—14 |
| 2,768,441 | 10/1956 | Russell | 32—14 |
| 2,794,788 | 6/1957 | Coover et al. | 32—14 |
| 2,835,791 | 5/1960 | Adams | 32—2 |
| 2,958,945 | 11/1960 | Waldman | 32—14 |
| 2,958,946 | 11/1960 | Chertkof | 32—17 |
| 3,052,027 | 9/1962 | Wallshein | 32—14 |

OTHER REFERENCES

Skeist, Irving: "Epoxy Resins," published 1958, page 254.

RICHARD A. GAUDET, *Primary Examiner.*

ROBERT E. MORGAN, *Examiner.*